United States Patent [19]

Mukai et al.

[11] Patent Number: 4,693,139
[45] Date of Patent: Sep. 15, 1987

[54] CONNECTING ROD OF RECIPROCATING MOTION SYSTEM AND METHOD FOR PRODUCING THE SAME

[75] Inventors: Masato Mukai, Saitama; Koichi Komatsu, Shizuoka, both of Japan

[73] Assignee: Honda Giken Kogyo Kabushiki Kaisha, Tokyo, Japan

[21] Appl. No.: 775,987

[22] Filed: Sep. 13, 1985

[30] Foreign Application Priority Data

Sep. 14, 1984 [JP] Japan .................... 193229

[51] Int. Cl.⁴ ............................... G05G 1/00
[52] U.S. Cl. .................... 74/579 E; 29/156.5 A
[58] Field of Search ............... 74/579 E, 579 R, 581, 74/587; 384/288, 294, 295, 267, 273; 29/156.5 A, 149.5, 525; 123/197 AB, 197 AC

[56] References Cited

U.S. PATENT DOCUMENTS

| | | | |
|---|---|---|---|
| 2,371,399 | 3/1945 | Mantle | 29/149.5 R |
| 2,553,935 | 5/1951 | Parks et al. | 29/156.5 A |
| 2,729,521 | 1/1956 | Mayback et al. | 384/294 |
| 2,875,513 | 3/1959 | Dulin | 29/156.5 A X |
| 3,149,404 | 9/1964 | Sims | 29/149.5 R X |
| 3,818,577 | 6/1974 | Bailey et al. | 74/579 E X |
| 3,994,054 | 11/1976 | Cuddon-Fletcher et al. | 74/579 E X |
| 4,037,888 | 7/1977 | Mirjanic | 74/579 R X |
| 4,073,550 | 2/1978 | Yahraus | 384/294 X |
| 4,569,109 | 2/1986 | Fetouh | 29/149.5 R X |

FOREIGN PATENT DOCUMENTS

| | | | |
|---|---|---|---|
| 58-37311 | 3/1983 | Japan . | |
| 776840 | 6/1957 | United Kingdom | 29/149.5 |
| 989946 | 4/1965 | United Kingdom | 29/149.5 |

Primary Examiner—Gary L. Smith
Assistant Examiner—Rodney M. Lindsey
Attorney, Agent, or Firm—Lyon & Lyon

[57] ABSTRACT

In a connecting rod of reciprocating motion system in which a larger diameter end portion is divided into a body side bearing half and a bearing cap, and in which after a bearing metal is incorporated in a bearing hole defined by the bearing half and the bearing cap, the bearing half and bearing cap are integrally connected together by bolts, chamfers are made in the peripheral portions of the bearing half and the bearing cap facing their broken and divided surfaces. Such chamfers are made before the dividing of the larger diameter end portion and thus cause the breaking and dividing operation to be facilitated.

3 Claims, 6 Drawing Figures

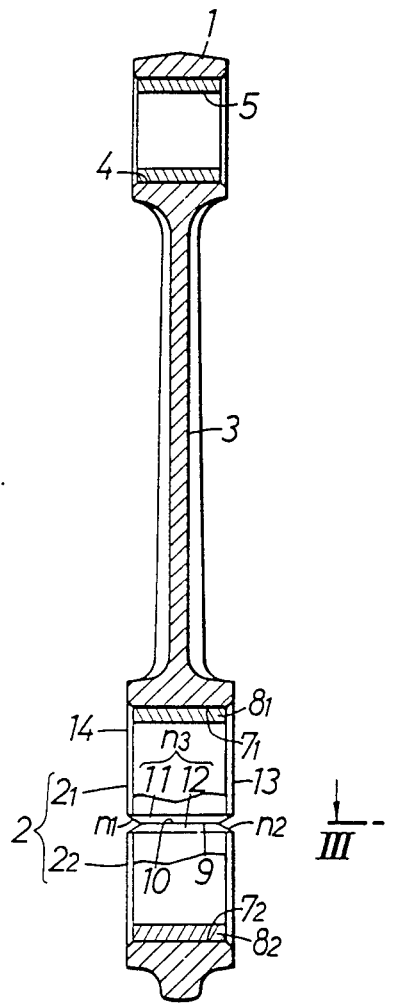
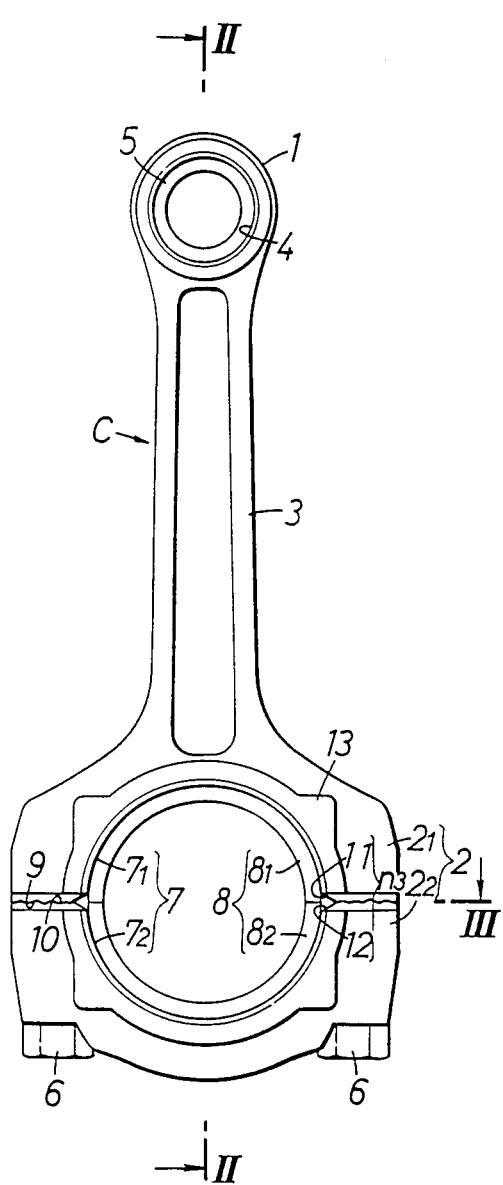

CONNECTING ROD OF RECIPROCATING MOTION SYSTEM AND METHOD FOR PRODUCING THE SAME

BACKGROUND OF THE INVENTION

1. Field of the Invention

The present invention relates to a connecting rod for use in reciprocating motion systems such as reciprocating internal combustion engines and a method for producing the same.

2. Description of the Prior Art

There are conventionally known such connecting rods for connecting a piston with a crankshaft in a reciprocating motion system, which include a larger diameter end portion broken and divided into a body side bearing half and a bearing cap, for example, as described in Japanese Patent Application Laid-open No. 37311/83.

In the production of such connecting rods, it is a conventional and common practice to make notches only in the axially opposite end surfaces of a larger diameter end portion of a product of connecting rod resulting from the forging of a blank, at which notches the larger diameter end portion is to be broken and divided into sections, and then subjecting the notched part of the larger diameter end portion to a carburizing and quenching treatment for hardening. Thereafter, the resulting larger diameter end portion is broken and divided into a body side bearing half and a bearing cap, which are subsequently clamped together by connecting bolts, and the larger diameter end portion is subjected to the finishing of its bearing hole. After such finishing, however, when split bearing metals are intended to be assembled to the respective semicircular bearing surfaces of the body side bearing half and the bearing cap, the reverses of the bearing metals may hit against the inner sharp edges of the broken and divided surfaces of the body side bearing half and the bearing cap and consequently, the reverses may be damaged or cut. In addition, the cut powder resulting from such cutting may remain on the broken and divided surfaces, which is apt to deteriorate re-assemblability of the larger diameter end portion.

THE SUMMARY OF THE INVENTION

It is therefore an object of the present invention to provide a connecting rod of reciprocating motion system and a method for producing the same, which is simple in construction, wherein the above problems are all overcome.

According to the present invention, the above object is accomplished by providing a connecting rod of reciprocating motion system in which a larger diameter end portion having a bearing hole made therein is broken and divided into a body side bearing half and a bearing cap, and a bearing metal is incorporated in the bearing hole, said bearing half and said bearing cap being connected together by connecting bolts, wherein a chamfer is made in the semicircular bearing surfaces of the body side bearing half and the bearing cap along their broken and divided surfaces, respectively.

With such an arrangement, in assembling the bearing metals to the two split parts of the larger diameter end portion of the connectng rod, the bearing metals can not be damaged or cut.

Further, according to the present invention, the chamferring may be made in the larger diameter end portion in the form of substantially V-shaped notches prior to the breaking and dividing of the larger diameter end portion into the body side bearing half and the bearing cap, and such breaking and dividing may be then conducted along the notches.

Therefore, the breaking and dividing can be extremely easily carried out, and regardless of the addition of the step for making notches, the method for producing the connecting rod can be kept from being complicated.

BRIEF DESCRIPTION OF THE DRAWINGS

The above and other objects, features and advantages of the present invention will become apparent from reading of the following description taken in conjunction with the accompanying drawings in which:

FIGS. 1 to 4 illustrate a first embodient of a connecting rod according to the present invention;

FIG. 1 is a front view thereof;

FIG. 2 is a sectional view taken along the line II—II in FIG. 1;

FIG. 3 is a view in cross section taken along the line III—III in FIG. 1;

FIG. 4 is a front view of a divided larger diameter end portion;

FIG. 5 is a fragmentary front view thereof; and

FIG. 6 is an enlarged view in part of FIG. 5.

DESCRIPTION OF THE PREFERRED EMBODIMENTS

Figure 3:
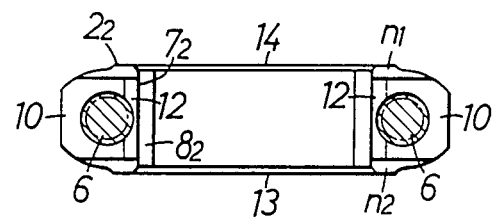

The present invention will now be described in more detail by way of preferred embodiments with reference to the accompanying drawings.

Referring to FIGS. 1 to 4, illustrating a first embodiment, there is shown a connecting rod C which comprises a smaller diameter end portion 1, a larger diameter end portion 2 and a straight rod portion 3 integrally connecting both the end portions 1 and 2. The smaller diameter end portion 1 has a pin hole 4 made therein. A bearing metal 5 is fitted in the pin hole 4, and has a piston pin of a piston (not shown) rotatably journaled thereon. The larger diameter end portion 2 is broken and divided into a body side bearing half $2_1$ integral with the rod portion 3, and a bearing cap $2_2$, which are integrally connected to each other by two connecting bolts 6. The larger diameter end portion 2 has a bearing hole 7 made therein, and a bearing metal 8 consisting of a pair of split metals $8_1$ and $8_2$ is fitted in the bearing hole 7. A crankpin of a crankshaft (not shown) is rotatably connected to the bearing metal 8. On the respective semicircular bearing surfaces $7_1$ and $7_2$ of the body side bearing half $2_1$ and the bearing cap $2_2$ constituting the larger diameter end portion 2, there are provided with chamfers 11 and 12 consisting of bevels or inclind surfaces along the broken and divided surfaces 9 and 10.

Figure 4:
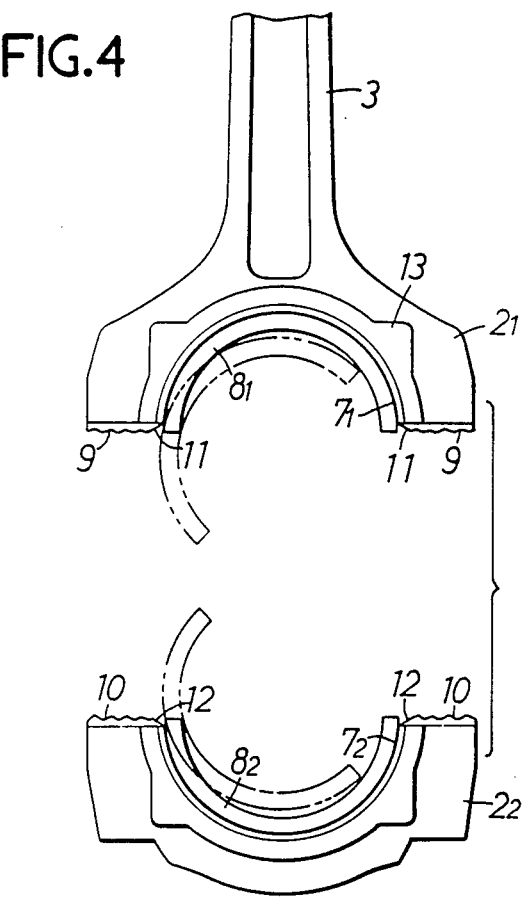

It is to be noted that in assembling the split metals $8_1$ and $8_2$ respectively to the semicircular bearing surfaces $7_1$ and $7_2$ of the body side bearing half $2_1$ and the bearing cap $2_2$, the chamfers 11 and 12 play an important role. Specifically, they serve to ensure that even if the reverses or peripheral surfaces of the split metals $8_1$ and $8_2$ hit against the corners of the divided surfaces 9 and 10 when the split metals $8_1$ and $8_2$ are assembled to the body side bearing half $2_1$ and the bearing cap $2_2$, as shown in FIG. 4, the reverses are not be damaged nor generate cut powder.

The chamfers 11 and 12 can be made in the course of the production of the connecting rod C. More particularly, before breaking and dividing the larger diameter portion 2 into the body side bearing half $2_1$ and the bearing cap $2_2$, a product of connecting rod resulting from the forging of a blank is processed by previously making V-shaped notches $n_1$, $n_2$ and $n_3$ in three surfaces, that is, in the axially opposite end surfaces 13 and 14 of the larger diameter end portion 2 and the inner peripheral surface of the bearing hole 7 along the intended breaking and dividing surfaces. Thereafter, the larger diameter end portion 2 may be broken and divided along the notches $n_1$, $n_2$ and $n_3$ into the body side bearing half $2_1$ and the bearing cap $2_2$. In this case, since the V-shaped notches $n_1$, $n_2$ and $n_3$ are made in the three surfaces along the intended breaking and dividing surfaces as described above, the breaking and dividing is easy to effect.

Alternatively, either one of the notches $n_1$ and $n_2$ may be made in one of the axially opposite end surfaces 13 and 14 of the larger end portion 2.

For the purpose of insuring the accuracy of the bearing hole 7, the body side bearing half $2_1$ and the bearing cap $2_2$ may be integrally clamped by the connecting bolts 6, and the bearing hole 7 may be subjected to a finishing. Thereafter, the larger diameter end portion 2 may be broken and divided into the body side bearing half $2_1$ and the bearing cap $2_2$, so that the chamfers 11 and 12 consisting of the bevels or inclined surfaces can be provided in the respective semicircular bearing surfaces $7_1$ and $7_2$ of the bearing half $2_1$ and the bearing cap $2_2$ along the broken and divided surfaces 9 and 10 by the V-shaped notches $n_3$.

Figure 6:
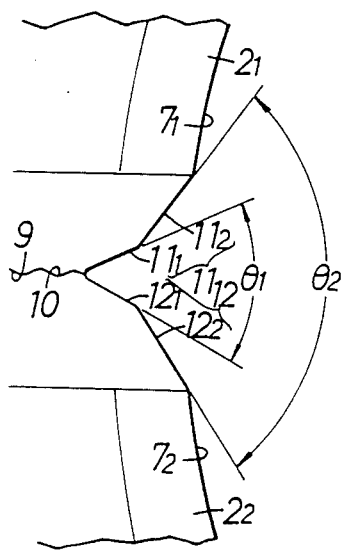
FIGS. 5 and 6 illustrate a second embodiment of a connecting rod according to the present invention.
Figure 5:
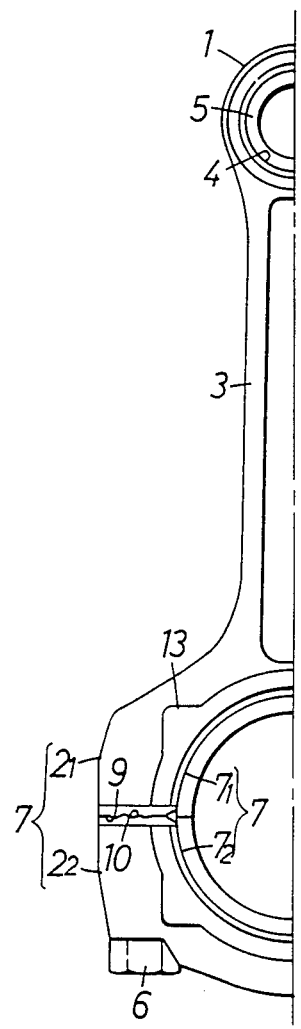

FIGS. 5 and 6 illustrate a second embodiment of the present invention. In this embodiment, chamfers 11 and 12, which are made in the broken and divided surfaces 9 and 10 of the semicircular bearing surfaces $7_1$ and $7_2$ of the body side bearng half $2_1$ and the the bearing cap $2_2$, respectively, are made into two stepped surfaces. In other words, the chamfer 11 (12) is comprised of a first step inclined surface $11_1$ ($12_1$) and a second gentle inclined surface $11_2$ ($12_2$). The angle $\theta_1$ formed by the first inclined surfaces $11_1$ and $12_1$ is of 45° to 50°, preferably 50°, and the angle $\theta_2$ formed by the second inclined surfaces $11_2$ and $12_2$ is of 90° to 110°, preferably 110°.

In the second embodiment, the breaking and dividing can be attained in the region of the V-shaped groove defined by the first inclined surfaces $11_1$ and $12_1$. In addition, the region of the V-shaped groove defined by the second inclined surfaces $11_2$ and $12_2$ may not be affected by the breaking and dividing. Thus, the reverses of the split metals can be more effectively prevented from being damaged or generating cut powder.

What is claimed is:

1. An internal combustion engine connecting rod including a larger diameter end portion which has a bearing hole made therein and is broken and divided into a body side bearing half and a bearing cap, with a bearing metal incorporated in said bearing hole, said body side bearing half and said bearing cap being integrally connected to each other by connecting bolts, wherein chamfers are made in the semicircular bearing surfaces of said body side bearing half and said bearing cap along broken and divided surfaces, respectively, of the bearing half and cap, each of said chamfers being made in the form of two stepped surfaces and including a first inclined surface close to said broken and divided surface and a second inclined surface close to said bearing surface, said first inclined surfaces of said chamfers together forming a first angle with respect to said divided surfaces and said second inclined surfaces of said chamfers together forming a second angle with respect to said divided surfaces, with said first angle being smaller than said second angle.

2. A connecting rod according to claim 1, wherein the first inclined surfaces of said chamfers disposed opposed to each other when integrally connecting said body side bearing half with said bearing cap constitute an angle of 45° to 50° in cooperation, and the second inclined surfaces constitute 90° to 110° in cooperation.

3. An internal combustion engine connecting rod including a larger diameter end portion which has a bearing hole therein and is broken and divided into a body side bearing half and a bearing cap, with a bearing metal incorporated in said bearing hole, said body side bearing half and said bearing cap being integrally connected to each other by connecting bolts, wherein chamfers are made in the semicircular bearing surfaces and on the axially opposite end surfaces of said body side bearing half and said bearing cap along the broken and divided surfaces of the bearing half and cap, with each of said chamfers made in the form of two stepped surfaces and including a first inclined surface close to said broken and divided surface and a second inclined surface close to said bearing surface, said first inclined surfaces of said chamfers together forming a first angle with respect to said divided surfaces and said second inclined surfaces of said chamfers together forming a second angle with respect to said divided surfaces, with said first angle being smaller than said second angle.

* * * * *